United States Patent Office 3,485,779
Patented Dec. 23, 1969

3,485,779
DIISOCYANATE MODIFIED VEGETABLE OIL HYDROXYL-TERMINATED POLYESTERAMIDE COATINGS
Lyle E. Gast and Wilma J. Schneider, Peoria, Ill., assignors to the United States of America as represented by the Secretary of Agriculture
No Drawing. Filed Oct. 19, 1967, Ser. No. 676,650
Int. Cl. C08g 22/10
U.S. Cl. 260—18      2 Claims

ABSTRACT OF THE DISCLOSURE

Baked urethane modified polyesteramide coatings produced by reacting diisocyanate with the hydroxyl-terminated polyesteramide resulting from refluxing particular dicarboxylic compounds with a slight excess of N,N-bis(2-hydroxyethyl) soybean amide or corresponding linseed amide, exhibit greatly improved resistance to dilute alkali.

---

A nonexclusive, irrevocable, royalty-free license in the invention herein described, throughout the world for all purposes of the United States Government, with the power to grant sublicenses for such purposes, is hereby granted to the Government of the United States of America.

DETAILED DESCRIPTION OF THE INVENTION

This invention relates to novel urethane-modified polyesteramides formed by the reaction of diisocyanates such as TDI on hydroxyl-terminated polyesteramide intermediates resulting from the reaction of certain critical dibasic acids or acid anhydrides with at least a 10 percent molar excess of an N,N-bis(2-hydroxyethyl) linseed or soybean fatty amide obtained by the base-catalyzed aminolysis of linseed oil or soybean oil, or by aminolysis of the mixed fatty acid methyl esters by diethanolamine.

Coatings of the herein claimed urethane-polyesteramide species of the invention on glass or metal substrates either dry rapidly in air or in some instances they can be baked, and the resulting hard, strongly adherent protective coatings exhibit remarkably extended resistances to 5-percent sodium hydroxide, ranging for some of the baked films from resistances of at least about 200 minutes to about 9960 minutes (166 hours) as compared with resistance values of only 2 minutes to little more than 60 minutes for analogous urethane-polyesteramides wherein the dicarboxylic constituent is maleic acid, brassylic acid, or the commercially available dimerized fatty acids of linseed or soybean oil.

Although diisocyanate modification of certain alkyd resins has been taught by Bailey et al., Offic. Dig. 32:984 (1960), and by Mennichen, J. Oil Colour Chem. Ass. 49:639 (1966), the alkali resistance values of the therein taught urethane-polyesters are still so nominal as to preclude coating usages in such faintly alkaline environments as for lining paint cans or in containers for such chemicals as calcium carbonate.

In sharp contrast, our invention provides vegetable oil based urethane polyesteramide coatings of which the most resistant species, i.e., soybean hydroxyl-terminated polyesteramide (HTPA) containing hydrogenated endo-cis-bicyclo(2,2,1)-5-heptene - 2,3 - dicarboxylic anhydride, which is available from Velsicol Chemical Corp., Chicago, Ill., under the registered name "Hydrogenated Endic Anhydride," resists 166 hours of exposure to a 5-percent solution of sodium hydroxide.

The invention thus comprises the unobviously superior products from reacting a conventional diisocyanate such as toluene diisocyanate or the coloration prone and less preferred aromatic diisocyanates with certain specific hydroxyl-terminated polyesteramide intermediates produced by reacting at least a 10-percent molar excess of linseed or soybean N,N-bis(2-hydroxyethyl) amide with certain critical dibasic acids, the improved alkali resistance (200 minutes or more) for baked films of the toluene diisocyanate-modified hydroxyl-terminated linseed (as distinguished from soybean) polyesteramides being exhibited only by the novel coatings in which the dibasic acid or acid anhydride component is a member of the group consisting of: hydrogenated endo-cis-bicyclo (2,2,1)-5-heptene - 2,3 - dicarboxylic anhydride, phthalic acid, isophthalic acid, and dimerized linseed fatty acids, while for the corresponding soybean oil-based hydroxyl-terminated polyesteramide urethanes the operative dibasic acid or anhydride constituent was found to be limited to hydrogenated endo-cis-bicyclo(2,2,1) - 5 - heptene-2,3-dicarboxylic anhydride, endo-cis-bicyclo(2,2,1)-5-heptene-2,3-dicarboxylic anhydride, phthalic acid, isophthalic acid, or itaconic acid. The linseed polymers in which the dibasic acid component was maleic or itaconic acid showed negligible resistance to alkali.

The following general procedure was employed in preparing the diisocyanate-modified hydroxyl-terminated polyesteramides (HTPA) of the invention: a reaction mixture consisting of 5.0 grams of a species of unmodified HTPA (the preparation of the starting materials subsequently used in the preparation of the several HTPA reactants being detailed in Examples 1–3), 15 grams of dry toluene, 17 mg. of an 8.65-percent solution of triethylene diamine in toluene, and sufficient aryl or alkyl diisocyanate to react with the available (reactive) hydrogens of the HTPA component was stirred at 105° C. for 3 hours. Films of the urethane-modified polyesteramides, with or without metallic naphthenate driers, were cast on glass or metal plates from toluene solutions containing 25-percent solids, using a drawdown bar that deposited wet films having an original thickness of 4 mils that dried either in air or with 10 minutes of baking at 200° C. to a dried film thickness of ca. 1 mil. Hardness tests after 3, 10, and 20 days of aging were made by the Sward Rocker technique. Alkali, dilute HCl, and xylene resistances were determined at room temperature on the films at 20 days (for uniformity) by periodic inspection through a convexly placed 1.5-inch watch glass under which we had introduced the alkali (5% NaOH), acid (5% HCl) or xylene. Gardner technique "dry-to-touch" and "tack-free" times were determined by periodically inspecting successive placements of sand on the films.

Example 1

Distilled diethanolamine (21 g., 0.2 mole), B.P. 170° C./25 mm. was placed in a round-bottomed flask fitted with a stirrer, thermometer, nitrogen inlet tube, and dropping funnel. Sodium methoxide catalyst (0.13 g., 0.0024 mole) was added and the flask was heated to 110–115° C. Then 29.5 grams (0.10 mole) of linseed mixed fatty acid methyl esters were added dropwise over a period of 15 minutes. The dropping funnel was then replaced by a vacuum take-off, and the reaction was continued for 1 hour at 20 mm. pressure with constant removal of byproduct methanol. The cooled reaction mixture was then dissolved in ether, washed with 15 percent aqueous NaCl, and dried over anhydrous $Na_2SO_4$. Filtration and evaporation of the ether solvent yielded 34 grams (93% of theory) of a yellow-orange oil which proved by TLC (thin-layer chromatography) to be N,N-bis(2-hydroxyethyl) linseed amide having a purity of 97.3 percent based on hydroxyl analyses.

*Analysis.*—Cal'd: C, 71.90%; H, 11.24%; N, 3.81%; OH, 9.25%. Found: C, 71.55%; H, 11.23%; N, 3.71%; OH, 9.00%.

Example 2

Optionally, a slightly better yield, i.e. 51.9 grams (94.1% of theory) of N,N-bis(2-hydroxyethyl) linseed amide but having a purity of 95 percent was more directly obtained by reacting 44 grams (0.05 mole) of linseed oil (in place of the ester of Example 1) and 31.5 grams (0.3 mole) diethanolamine at 115° C. for 35 minutes in the presence of 0.19 gram (0.0035 mole) of sodium methoxide.

Example 3

105.7 grams (95.4% of theory) of N,N-bis(2-hydroxyethyl) soybean amide intermediate (95.5% pure) was obtained by substituting soybean oil (88 g., 0.1 mole) for the linseed oil reactant of Example 2 along with 63.0 grams (0.6 mole) of diethanolamine and 0.38 gram of sodium methoxide.

Example 4

A hydroxy-terminated linseed polyesteramide (HTPA) polymer intermediate for subsequent polyurethane formation (as in Example 12) and containing as one reactant a 10 percent molar excess of the N,N-bis(2-hydroxyethyl) linseed amide intermediate of Example 2 over the dibasic acid anhydride reactant was now produced by refluxing a reaction mixture consisting of 100 ml. of xylene solvent, 42.5 grams (0.11 mole) of the said N,N-bis(2-hydroxyethyl) linseed amide of Example 2 and 16.6 grams (0.10 mole) of commercially obtained endo - cis - bicyclo(2,2,1)-heptane-2,3-dicarboxylic anhydride until the Dean-Stark trap had collected the theoretical amount of water. Then the trap was removed and the reacted mixture was distilled for an additional 3 hours with replenishments of xylene to eliminate the last traces of water. Then the xylene was removed from the thusly produced HTPA species in a rotary film evaporator under 2 mm. pressure, yielding 57.3 grams of a novel intermediate, namely hydroxyl-terminated linseed endo-cis-bicyclo(2,2,1)-heptane-2,3-dicarboxylic anhydride, a portion of which brownish viscous oil-like polyesteramide was then reacted with diisocyanate as described in Example 12 to produce the unexpectedly superior urethane derivative thereof.

Example 5

Example 4 was repeated excepting that 16.4 grams (0.1 mole) of "Endic Anhydride," Velsicol Chemical Company's trademark for endo-cis-bicyclo(2,2,1)-5-heptene-2,3-dicarboxylic anhydride, was substituted for the trade marked hydrogenated analog used in Example 4. The resulting oil-like hydroxyl-terminated linseed endo-cis - bicyclo(2,2,1) - 5-heptene-2,3-dicarboxylic anhydride polyesteramide was obtained in a yield of 57.1 grams. A portion of this novel polyesteramide was subsequently reacted with toluene diisocyanate to produce the alkali resistant diisocyanate modified polyesteramide of Example 13.

Example 6

Example 4 was repeated excepting that phthalic anhydride (14.8 g., 0.1 mole) was used in place of the endo-cis-bicyclo(2,2,1)-heptane-2,3-dicarboxylic anhydride reactant. The yield of linseed-phthalic HTPA was 55.5 grams, a portion of which was subsequently reacted with TDI to yield the novel urethane-modified polyesteramide of Example 14.

Example 7

Example 4 was repeated with the exception that isophthalic acid (16.6 g., 0.1 mole) was substituted as the dicarboxylic acid component. The yield of linseed-isophthalic HTPA was 55.5 grams, and a portion thereof was subsequently reacted with TDI to yield the urethane-modified polyesteramide of Example 15.

Example 8

Example 4 was repeated with the exception that 42.4 grams (0.11 mole) of the N,N-bis(2-hydroxyethyl) soybean amide of Example 3 was used in place of the corresponding linseed amide of Example 2. The yield of soy endo-cis-bicyclo(2,2,1)-heptane-2,3-dicarboxylic anhydride HTPA was 57.2 grams. A portion of this product was subsequently reacted with TDI to produce the urethane-modified polyesteramide of Example 16.

Example 9

Example 5 was repeated with the exception that 42.4 grams (0.11 mole) of N,N-bis(2-hydroxyethyl) soybean amide of Example 3 was used in place of the corresponding linseed amide reactant of Example 2. The yield of hydroxyl-terminated soybean endo-cis-bicyclo(2,2,1)-5-heptene-2,3-dicarboxylic anhydride polyesteramide was 57.0 grams. A portion of this hydroxyl-terminated polyesteramide was subsequently reacted with TDI to provide the urethane-modified polyesteramide coating material of Example 17.

Example 10

Example 6 was repeated with the exception that N,N-bis(2-hydroxyethyl) soybean amide (42.4 g., 0.11 mole) of Example 3 was used in place of the corresponding linseed amide reactant. The yield of soy-phthalic HTPA was 55.4 grams. A portion of this product was reacted with TDI as indicated in Example 18 to produce the urethane-modified polyesteramide.

Example 11

Example 7 was repeated with the exception that N,N-bis(2-hydroxyethyl) soybean amide (42.4 grams, 0.11 mole) was used in place of the corresponding linseed amide reactant. The yield of soy-isophthalic HTPA was 55.4 grams. A 5-gram portion of this product was reacted with TDI to form the urethane-modified polyesteramide of Example 19.

In the following examples, the toluene diisocyanate was added in amounts sufficient to constitute about 1 equivalent of isocyanate per equivalent of the hydroxyl content of the HTPA product.

Example 12

Five grams of the HTPA product of Example 4, dry toluene reaction solvent (15 g.), 17 mg. of an 8.65-percent solution of triethylene diamine in toluene, and 0.17 gram of toluene diisocyanate (TDI) were stirred at 105° C. for 3 hours. Because isolation of the diisocyanate-modified polyesteramide polymer from solution showed that the last traces of solvent could not be removed without partial gelation, films were prepared directly from the reaction solution. The metallic drier-containing air-dried films were found to be dry-to-touch in 18 minutes, to be tack-free in 24 minutes, to have a Sward Rocker (hardness) value of 24 and 60 after, respectively, 3 days and 10 days of aging, and to exhibit 126 minutes of resistance to 5% NaOH, 150 hours to 5% HCl, and more than 192 hours of resistance to xylene. Without the drier the unbaked films took 11 hours to dry-to-touch and showed only 21 minutes of alkali resistance. Naphthenate-free films that were identical to the above films excepting for their having been baked at 200° C. for 10 minutes were not damaged by 7 hours (i.e., 420 minutes) of exposure to 5% NaOH. By contrast, air-dried films from the corresponding phthalic, maleic, and itaconic analogs without driers showed alkali resistances of only 9, 2, and 6 minutes, respectively, while with driers the air-dried films exhibited respective alkali resistances of 20, 5, and 20 minutes. The corresponding drier-containing but baked films exhibited, respectively, phthalic, 3.5 hours; maleic, 0.5 hour; and itaconic, 0.3 hour of resistance to 5% NaOH.

Example 13

Example 12 was repeated excepting that the HTPA product of Example 5 was reacted with 0.18 gram of TDI to yield the diisocyanate-modified linseed "Endic Anhydride" polyesteramide.

Air-dried films not containing metallic driers became dry-to-touch in 4.3 hours and tack-free by an additional half-hour, but the resistance to 5% NaOH was only 34 minutes. However, films containing 0.5 percent lead and 0.01 percent cobalt as naphthenates became tack-free in only 18 minutes. The air-dried films with added driers were now resistant to alkali for 100 minutes, to 5% HCl for an unchanged 110 hours, and to xylene for a likewise unchanged 192 hours. The Rocker-hardness value of films aged for 3 days was 60 which increased to a value of 70 in films aged for 20 days.

Example 14

Example 12 was repeated excepting that the HTPA product of Example 6 was reacted with 0.22 gram of TDI to produce the diisocyanate-modified linseed-phthalic anhydride polyesteramide.

Air-dried films without the metallic driers became dry-to-touch in 4.3 hours and tack-free by 5.0 hours but the alkali resistance was only 9 minutes, and this increased to only 20 minutes for films containing the metallic driers. However, baked films of the latter resisted alkali for 210 minutes, the acid for 97 hours, and the xylene for more than 192 hours. The 3-day Rocker-hardness value was 26, and the 17-day value increased to 46, thus showing that the 10 minutes of baking at 200° C. did not completely cure the films. However, since the industrial use of briefly baked partially dried films is conventional, our urethane-modified coatings have the indicated utility.

Example 15

Example 12 was repeated excepting that the HTPA product of Example 7 was reacted with 0.18 gram of TDI to yield the urethane-modified linseed-isophthalic acid polyesteramide.

Films without added driers air-dried to touch in 5.2 hours and showed only 18 minutes of alkali resistance. With added driers the dry-to-touch time fell to 42 minutes but the alkali resistance remained essentially unchanged. However, the drier-containing films that were ovened rather than dried in air resisted the alkali for 270 minutes, the acid for 76 hours, and xylene for in excess of 192 hours. The baked films that were aged for 3 days had a Rocker-hardness value of 28, but by 17 days of aging the hardness value increased to 58.

Example 16

Example 12 was repeated excepting that the HTPA product of Example 8 was reacted with 0.26 gram of TDI to yield the diisocyanate-modified soybean "Hydrogenated Endic Anhydride" polyesteramide.

The air-dried films containing the metallic naphthenate driers dried-to-touch in 140 minutes and became tack-free in 180 minutes. They resisted the alkali for 225 minutes, the HCl for 168 hours, and the xylene for 167 hours. Their hardness value after 3 days of aging was 36 which in the 10-day films increased to 42.

The corresponding films without the driers dried very slowly and after 3 days of aging had a hardness value of only 7. However, the alkali resistance was more than 5 times that of the films with the driers, i.e., 21.5 hours (1290 minutes), while the resistance to the HCl now exceeded 218 hours.

Films containing the driers but that were baked at 200° C. for 10 minutes instead of being air-dried resisted the alkali for 69 hours, the acid for 78 hours, and the xylene for in excess of 192 hours. Baked films not containing the driers showed an almost incredible alkali resistance of 166 hours, and 168 hours of resistance to 5% HCl.

Example 17

Example 12 was repeated excepting that 5 grams of the HTPA product of Example 9 was substituted for that from Example 4 and was reacted with 0.22 gram of TDI to produce the diisocyanate-modified soybean endo-cis-bicyclo(2,2,1) - 5 - heptene - 2,3-dicarboxylic anhydride ("Endic Anhydride") polyesteramide.

Without added driers, the films showed poor air-drying tendencies, which were consistent with a Rocker-hardness value of only 6 after 3 days of aging and a value of 14 after 10 days of aging. However, without metallic driers the alkali resistance of 180 minutes was 10½ fold that of films that were identical excepting for the presence of driers. A 144-hour resistance to the dilute acid was not changed by the presence or absence of driers.

When the films were baked rather than air-dried, the alkali resistance was 480 minutes, with or without the driers. However, the baked films without driers had a 3-day hardness value of 20 (almost twice that with drier) and had greater than 218-hour resistance to the aqueous HCl, as compared with 144 hours of acid resistance in films containing the driers.

Example 18

Example 12 was repeated excepting that 5 grams of the HTPA product of Example 10 replaced that from Example 4 and was reacted with 0.21 gram of TDI to provide the diisocyanate-modified soy-phthalic anhydride polyesteramide.

Air-dried films not containing added driers had a hardness of only 6 after 3 days. However, the films had an alkali resistance of 210 minutes, an acid resistance of 135 hours, and a xylene resistance of more than 224 hours. With added driers, the films dried in about 1 hour and had a Rocker-hardness value of 30 by 3 days. However, the latter films began to deteriorate after only 20 minutes of exposure to alkali.

Baked films of the urethane-modified soy-phthalic polyesteramide without added driers exhibited 12 hours of resistance to the dilute alkali and 97 hours to the dilute HCl, whereas the same films, but containing added driers, resisted the alkali for 38 hours and resisted the acid for 135 hours.

Example 19

Example 12 was repeated excepting that 5 grams of the HTPA product of Example 11 replaced that from Example 4 and was reacted with 0.25 gram TDI to give the diisocyanate-modified soy-isophthalic polyesteramide.

Air-dried films without added driers dried slowly and had a hardness value of 6 at 3 days. The films resisted the alkali for 126 minutes and the acid for 135 hours. With added driers, the dry-to-touch and tack-free time was 30 minutes, the 3-day hardness value was 39, the alkali resistance time was 45 minutes, the acid resistance time was 190 hours, and the xylene resistance was in excess of 224 hours.

Baked films without added driers had a 3-day hardness value of 20 and they resisted the alkali for 7 hours, the acid for 190 hours, and the xylene for over 192 hours. Baked films containing the driers had a 3-day Rocker hardness value of 23 and resistances of 23 hours to alkali, 135 hours to the acid, and more than 192 hours to xylene.

Thus, the varied alkali resistance data set forth in the foregoing examples clearly illustrate the impossibility of predicting the conditions under which a selected species would be operative for the intended purpose.

We claim:
1. The reaction product of (A) about 1 equivalent of toluene diisocyanate with (B) about 1 equivalent based on the hydroxyl content of a hydroxy terminated polyesteramide having been produced by refluxing a xylene solution containing dissolved therein a dicarboxylic member selected from the group consisting of:

ando-cis-bicyclo(2,2,1)-heptane-2,3-dicarboxylic anhydride,
ando-cis-bicyclo(2,2,1)-heptene-2,3-dicarboxylic anhydride,
phthalic anhydride, and
isophthalic acid, and 1.1 molar equivalents based on the dicarboxylic member of N,N-bis(2-hydroxyethyl) soybean amide that is formed by an alkoxide catalyzed reaction of soybean oil with diethanolamine.

2. A metal substrate having a baked coating thereon, said coating being capable of withstanding 166 hours of exposure to 5% NaOH at room temperature, said coating consisting essentially of a diisocyanate-modified hydroxyl-terminated polyesteramide produced by reacting in the presence of a solution of triethylene diamine in dry toluene: (I) .26 gram of toluene diisocyanate (II) 5 grams of a hydroxyl terminated polyesteramide which is obtained by refluxing a xylene solution of (A) .11 mole of N, N-bis (2-hydroxy ethyl) soybean amide, and (B) .10 mole of endo-cis- bicyclo (2,2,1) -heptane-2,3-dicarboxylic anhydride.

References Cited

UNITED STATES PATENTS

| | | | |
|---|---|---|---|
| 3,387,008 | 6/1968 | Cawley | 260—404.5 X |
| 3,380,840 | 4/1968 | Harrison | 260—404.5 X |
| 3,267,080 | 8/1966 | Kamal | 260—18 X |

FOREIGN PATENTS

| | | |
|---|---|---|
| 953,357 | 3/1964 | Great Britain. |

OTHER REFERENCES

Industrial and Engineering Chemistry, "Reactions of Isocyanates with Drying Oils," Wilson et al., vol. 51, No. 11, November 1959.

DONALD E. CZAJA, Primary Examiner

C. W. IVY, Assistant Examiner

U.S. Cl. X.R.

117—132; 260—22, 75